(12) United States Patent
Liu et al.

(10) Patent No.: US 10,096,139 B2
(45) Date of Patent: Oct. 9, 2018

(54) GENERATING GRAPHICAL DEPICTIONS OF DATA SETS BASED ON MAPPING PATHS OF GRAPHICAL OBJECTS TO DATA PROPERTIES

(71) Applicant: Adobe Systems Incorporated, San Jose, CA (US)

(72) Inventors: Zhicheng Liu, Redwood City, CA (US); Alan Grant Wilson, Cedar Hills, UT (US)

(73) Assignee: Adobe Systems Incorporated, San Jose, CA (US)

( * ) Notice: Subject to any disclaimer, the term of this patent is extended or adjusted under 35 U.S.C. 154(b) by 82 days.

(21) Appl. No.: 15/018,105

(22) Filed: Feb. 8, 2016

(65) Prior Publication Data
US 2017/0228898 A1    Aug. 10, 2017

(51) Int. Cl.
*G06T 11/20*    (2006.01)
*G06F 3/0484*    (2013.01)

(52) U.S. Cl.
CPC ........ *G06T 11/206* (2013.01); *G06F 3/04845* (2013.01)

(58) Field of Classification Search
CPC .................................................. G06T 11/206
See application file for complete search history.

(56) References Cited

U.S. PATENT DOCUMENTS

| | | | |
|---|---|---|---|
| 2012/0102419 A1* | 4/2012 | Mital | G06T 11/206 715/765 |
| 2012/0144325 A1* | 6/2012 | Mital | G06F 9/4446 715/763 |

(Continued)

OTHER PUBLICATIONS

Arvind Satyanarayan, et al., UW Interactive Data Lab, Lyra: "An Interactive Visualization Design Environment (VDE)" downloaded from http://idl.cs.washington.edu/proiects/lyra, Dec. 29, 2015, 3 pages.

(Continued)

*Primary Examiner* — Jeffery A Brier
(74) *Attorney, Agent, or Firm* — Kilpatrick Townsend & Stockton LLP

(57) ABSTRACT

Certain embodiments involve generating graphical depictions of data sets based on mapping paths of graphical objects to data properties. In one example, a graphics editing application displays a graphical interface for mapping a vector-based graphic to a data set. The vector-based graphic includes graphical objects defined by connected paths. The graphical interface receives input specifying modifications to visual properties of different graphical objects. For graphical objects mapped to data properties in the data set, the graphics editing application applies constraints to visual property modifications, where the constraints are based on mappings to the data properties in the data set. For graphical objects without mappings to data properties, the graphics editing application applies visual property modifications without these constraints. The graphics editing application updates the graphical interface to include modified versions of the vector-based graphic, with the graphical objects having mappings being modified in accordance with the applied constraints.

18 Claims, 9 Drawing Sheets

(56) References Cited

U.S. PATENT DOCUMENTS

| | | | | |
|---|---|---|---|---|
| 2012/0148088 A1* | 6/2012 | Mital | .................... | G06T 11/206 |
| | | | | 382/100 |
| 2012/0154402 A1* | 6/2012 | Mital | .................... | G06T 11/206 |
| | | | | 345/440 |
| 2012/0154403 A1* | 6/2012 | Mital | .................... | G06T 11/206 |
| | | | | 345/440 |
| 2013/0159032 A1* | 6/2013 | Sunshine | ............... | G06Q 10/02 |
| | | | | 705/5 |
| 2015/0187337 A1* | 7/2015 | Baxter | .................. | G06F 3/0481 |
| | | | | 345/660 |

OTHER PUBLICATIONS

Michael Bostock, et al., "$D^3$: Data-Driven Documents", Computer Science Department Stanford University Aug. 1, 2011, posted Oct. 23, 2011, 9 pages.

Michael Bostock, et al., "Protovis: a Graphical Toolkit for Visualization", Computer Science Department Stanford University, Jul. 27, 2009, posted Oct. 5, 2009, 8 pages.

H. Carr, et al., "Lyra: An Interactive Visualization Design Environment", Eurographics Conference on Visualization 2014, vol. 33, No. 3, 10 pages.

\* cited by examiner

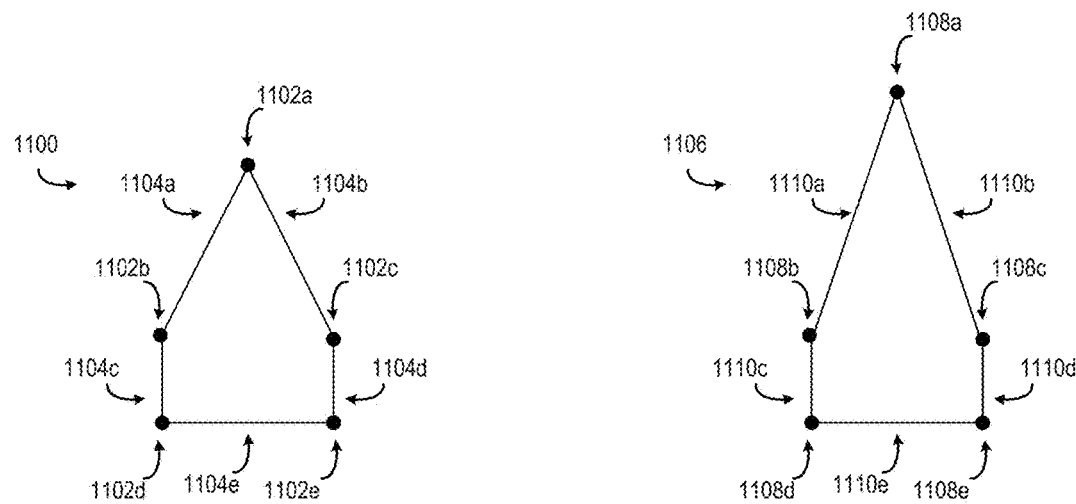
FIG. 11
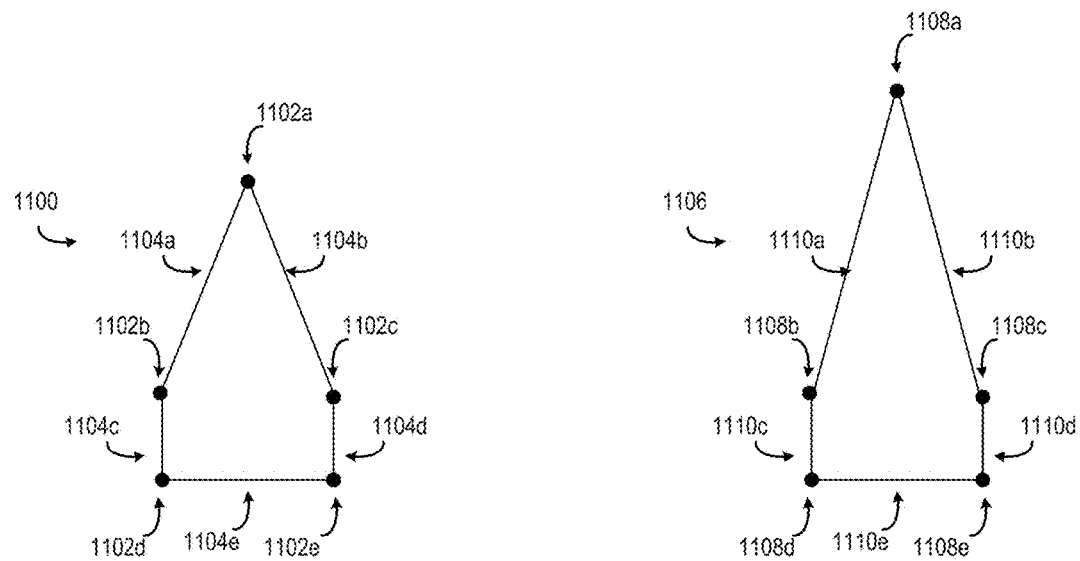
FIG. 12
FIG. 13

US 10,096,139 B2

GENERATING GRAPHICAL DEPICTIONS OF DATA SETS BASED ON MAPPING PATHS OF GRAPHICAL OBJECTS TO DATA PROPERTIES

TECHNICAL FIELD

This disclosure relates generally to computer-implemented methods and systems and more particularly relates to generating graphical depictions of data sets based on mapping paths of graphical objects to data properties in data sets.

BACKGROUND

A delimited data set, such as data stored in a spreadsheet or a comma-separated value file, can be visually depicted using data graphics. In a simple example, certain spreadsheet applications allow a delimited data set to be visually depicted as a bar graph or other graph. In these applications, a first field in a delimited data set, such as a column of a spreadsheet, is mapped to an x axis of the bar graph and a second field in the delimited data set (e.g., another column of the spreadsheet) is mapped to a y axis of the bar. Values of the first mapped field are displayed on the x axis and corresponding values of the second mapped field are displayed on they axis, thereby creating the bar graph.

Rather than creating a wholly new graphical depiction such as a bar graph, some prior solutions modify pre-existing graphics to correspond to data in a delimited data set, thereby using the modified graphics to visually depict the delimited data. These solutions include data visualization platforms, such as Lyra, that map data sets to the visual properties of graphical objects in a graphics file. For example, a pre-existing graphic, such as a map of the United States, may include graphical objects, such as depictions of individual states. A first column of a spreadsheet is mapped to these graphical objects (e.g., values in a "State" column being mapped to visual depictions of the states), and a second column of the spreadsheet is mapped to visual properties of these graphical objects (e.g., values in a "Poverty level" column being mapped to different color values). In this manner, the separate graphical objects (e.g., states on the map) play the same role as the x axis of a bar graph in the example above, and the color variations for different graphical objects play the same role as they axis of the bar graph.

These prior solutions for creating graphical depictions of data sets from pre-existing graphics present disadvantages. One disadvantage includes using shapes (e.g., rectangles, circles, etc.) as the basis for a mapping. In the example of the Lyra data visualization platform provided above, a user would be limited to mapping a given value of a data field to an entire graphical object, such as a visual depiction of an entire state. This type of mapping causes the mapped data value to affect the visual property for the entire shape. This limited granularity in the data-to-graphics mapping causes limited flexibility in how data sets can be visually depicted using pre-existing graphics.

Another disadvantage of these prior solutions includes reduced flexibility in manipulating a graphical depiction of data that has already been generated. For instance, some data visualization platforms may generate a graphical depiction of a data set, such as a U.S. map with different colored states, but may not allow a user to manipulate properties of the graphical depiction. If a user, after viewing the graphical depiction generated from the data-to-graphic mapping, wishes to adjust visual properties of certain graphical objects (e.g. the coloring of depictions of U.S. states), the user may be required to rebuild the entire graphical depiction from scratch (e.g., by creating a new mapping of color values to data field values) rather than manually adjusting visual properties of specific graphical objects. Furthermore, existing data visualization platforms may not allow a user to manipulate graphical objects that are not mapped to any data fields (e.g., depictions of U.S. states for which no poverty data is present in the data set).

Therefore, it is desirable to provide tools for graphically depicting data sets that provide greater flexibility in how users can manipulate a graphical depiction that has been generated using a mapping to a data set.

SUMMARY

According to certain embodiments, systems and methods are provided for generating graphical depictions of data sets based on mapping paths of graphical objects to data properties. In one example, a graphics editing application displays a graphical interface for mapping a vector-based graphic to a data set. The vector-based graphic includes graphical objects defined by connected paths, such as curves or line segments between pairs of anchor points. The graphical interface receives input specifying modifications to visual properties of different graphical objects. For graphical objects mapped to data properties in the data set, the graphics editing application applies constraints to visual property modifications, where the constraints are based on mappings to the data properties in the data set. For graphical objects without mappings to data properties, the graphics editing application applies visual property modifications without these constraints. The graphics editing application updates the graphical interface to include modified versions of the vector-based graphic, with the graphical objects having mappings being modified in accordance with the applied constraints.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

Features, embodiments, and advantages of the present disclosure are better understood when the following Detailed Description is read with reference to the accompanying drawings, where:

FIG. 11 is a diagram depicting an example of graphical objects having sets of anchor points that can be partially mapped to properties of a data set according to certain exemplary embodiments;

FIG. 12 is a diagram depicting an example of a mapping between subsets of the anchor points of FIG. 11 and properties of a delimited data set according to certain exemplary embodiments;

FIG. 13 is a diagram depicting an example of graphical objects of FIG. 11 with the modifications based on the mapping of subsets of anchor points to properties of the data set depicted in FIG. 12 according to certain exemplary embodiments;

DETAILED DESCRIPTION

Figure 1:
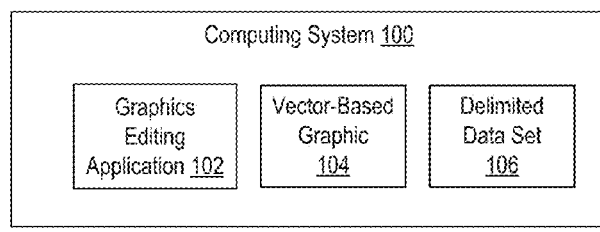
FIG. 1 is a block diagram depicting an example of a computing system that executes a graphics editing application for using a vector-based graphic to graphically depict data from a delimited data set according to certain exemplary embodiments.

As discussed above, prior techniques for graphically depicting data sets may provide insufficient flexibility in how the graphical depictions can be manipulated. Embodiments are disclosed that allow a graphics editing application (e.g., Adobe® Illustrator®) to generate path-based mappings between a data set and vector-based graphics. In some embodiments, these path-based data mappings provide improved flexibility in how a graphical depiction of the data set that is generated from the data mappings can be manipulated by a user.

In one example, rather than mapping values of data fields to entire shapes (e.g., circles, rectangles, etc.), the graphics editing application is used to map values of data fields to one or more paths that define the shape. For instance, a circle may be defined by a set of anchor points and a corresponding set of curved segments between pairs of the anchor points. In this example, the graphics editing application is used to map values of a data field to a subset of anchor points (or a path defined by the subset of anchor points) rather than the entire circle. Thus, the data mapping affects a portion of the circle rather than the entire circle. This increases the granularity of the data mapping and allows for more precise graphical depictions of the mapped data via a graphic.

In another example, the graphics editing application is used to modify the resulting graphical depiction in accordance with the data mapping. For instance, if a visual property (e.g., a color) is modified for one graphical object in a set of graphical objects that is mapped to a data set, then visual properties for other graphical objects in the set of graphical objects are modified in a corresponding manner to maintain a visual depiction of relationships between data values in the data set. However, if certain graphical objects are not subject to any data mapping, the graphics editing application can be used to freely modify these un-mapped graphical objects.

In some embodiments, the graphics editing application generates or otherwise provides a graphical interface for displaying a vector-based graphic, such as an image of a forest in a Scalable Vector Graphics ("SVG") file format. The vector-based graphic includes multiple graphical objects, such as visual depictions of trees in the forest. Each graphical object is defined by or otherwise includes multiple paths. For example, a given tree might be defined by or otherwise include paths (e.g., line segments) that constitute an outline of the tree's trunk and paths (e.g., curved segments) that constitute outlines of the tree's branches.

As used herein, the term "vector-based graphic" is used to refer to any image, drawing, or other graphic having one or more graphical objects that are defined using one or more vectors that include values used by a computing device to render the graphical object for a display. In a simple example, a vector-based graphic can include one or more vectors defining a circle. The vectors defining the circle include vector values specifying sets of anchor points (e.g., coordinates in an x-y plane) and vector values specifying that curves should be drawn between pairs of the anchor points to render the circle. In the more complex example of a forest image described above, one or more vectors can include start and end points for the paths (e.g. anchor points defining the paths), widths of the paths, colors of the paths, fill colors for a space enclosed by a set of paths, etc.

The graphics editing application uses a data mapping between paths of graphical objects and fields of a data set to constrain modifications of the displayed vector-based graphic. For example, the graphics editing application may receive, via the graphical interface, one or more inputs specifying a modification to a visual property of a first graphical object, such as a change to a color of a first tree, and a modification to a visual property of a second graphical object, such as a change to the shape of a second tree.

As used herein, the term "visual property" is used to refer to any characteristic of a vector-based graphic that controls how the vector-based graphic is rendered for display. Examples of visual properties include, but are not limited to, sizes of graphical objects, positions of graphical objects, colors of graphical objects, curvatures of paths that define graphical objects, etc. In some embodiments, values of visual properties are controlled by values in one or more vectors of a vector-based graphic. For example, a vector-based graphic of an ellipse may include vector values defining anchor points of the ellipse, colors of paths connecting the anchor point, and a color of space enclosed by the connected paths. The position of the ellipse can be modified by changing vector values that identify the positions of the anchor points (e.g., coordinates in an x-y plane).

The color of the ellipse's outline or the ellipse's fill color can be modified by changing vector values that include color information (e.g., RGB color information in a color scale, a color library, opacity, transparency, etc.).

The graphics editing application determines whether the graphical objects associated with the received inputs are subject to any data mappings. For example, the graphics editing application may determine that at least one path used to define the first tree is mapped to a data property (e.g., one or more fields) in a delimited data set. The graphics editing application also determines that no path used to define the second tree is mapped to any data property in the data set. The graphics editing application applies a constraint to certain modifications that affect graphical objects having paths mapped to a data set. The graphics editing application also allows other modifications that affect paths of graphical objects without data mappings to be implemented without any mapping-based constraints.

For example, the vector-based graphic depicting a forest may be mapped to a delimited data set that describes ages of different types of trees. As used herein, the term "delimited data set" is used to refer to a data file in which data is organized into multi-dimensional arrays of data having one or more data values designated as a delimiter for specifying boundaries between different entries in an array. Non-limiting examples of a delimited data file include a spreadsheet, a data file having comma-separated values, a data file having tab-separated values, a data file having colon-separated values, etc. Non-limiting examples of data arrays can include rows corresponding to records, columns corresponding to fields in records, or both.

In the example of a forest graphic being mapped to a delimited data set that describes ages of different tree types, one or more first paths (or their associated anchor points) defining the trunk of a first tree may be mapped to a first record in the data set having a first field value describing an age for a first type of tree, and one or more second paths (or their associated anchor points) defining the trunk of a second tree may be mapped to a second record in the data set having a second field value describing an age for a second type of tree. The relative lengths of the first paths and the second paths are constrained based on the mapping. For example, the relative lengths may be constrained so that a relationship between graphical depictions of the first and second trees (e.g., trunk lengths determined by data-mapped paths) corresponds to a relationship between ages of different tree types in the data set.

In this example, the graphics editing application uses the mapping to constrain modifications to the vector-based graphic depicting the forest. For instance, if an input received by the graphics editing application specifies a modification to the length of a first path defining the first tree, the graphics editing application determines that the length of a second path defining the second tree must be modified so that the relationship between graphical depictions of the first and second trees, which corresponds to a relationship between ages of different tree types in the data set, is maintained. The graphics editing application may also apply modifications that affect graphical objects that lack data mappings in an unconstrained manner. For example, if the graphics editing application determines that paths defining leaves of one or more trees are not mapped to any field of the delimited data set, the graphics editing application applies specified modifications affecting the leaves without the constraints that may be applied to paths defining tree trunks.

Although the example above describes mapping a visual property such as path length to data properties in a data set, the graphics editing application can map data properties to any suitable visual properties defined by vectors of a vector-based graphic. In some embodiments, colors associated with paths or spaces enclosed by paths are mapped to data properties. For example, if a first record in the data set is mapped to a first path and a second record in the data set is mapped to a second path, a relationship between field values (e.g., a first field value being twice the second field value) can be graphically depicted by changing first color information associated with a first path and second color information for a second path to reflect the relationship between field values. In additional or alternative embodiments, other visual properties associated with graphical objects (e.g., positions of anchor points, curvature of segments connecting pairs of anchor points, etc.) can also be used to graphically depict relationships among data in a delimited data set.

Referring now to the drawings, FIG. 1 is a block diagram depicting an example of a computing system 100 that executes a graphics editing application 102 for using a vector-based graphic 104 to graphically depict data from a delimited data set 106. The graphics editing application 102 allows a user to display, create, manipulate, or otherwise use a vector-based graphic 104 and, in some embodiments, graphical data such as images, drawings, etc.

The graphics editing application 102 includes program code executable by a processing device to perform one or more operations described herein. In some embodiments, the graphics editing application 102 is a stand-alone application. In other embodiments, the graphics editing application 102 includes one or more modules incorporated into another application.

The computing system 100 includes one or more computing devices. In various embodiments, the computing system 100 includes a stand-alone computing device, a set of computing devices configured for cloud computing or other distributed computing, or some combination thereof. (An example of a computing system that can execute the graphics editing application 102 is described herein with respect to FIG. 15.) In some embodiments, one or more of the vector-based graphic 104 and the delimited data set 106 are stored on a memory device of the computing system 100. In additional or alternative embodiments, one or more of the vector-based graphic 104 and the delimited data set 106 are accessed via a network by the computing system 100 that executes the graphics editing application 102.

The graphics editing application 102 generates a graphical depiction of the delimited data set 106 from a combination of the vector-based graphic 104 and at least some of the data in the delimited data set 106. For instance, FIG. 2 is a diagram depicting an example of a graphical interface 200 used by the graphics editing application 102 to map the delimited data set 106 to graphical objects 202, 204, 206, 208, 210 of the vector-based graphic 104.

Figure 2:
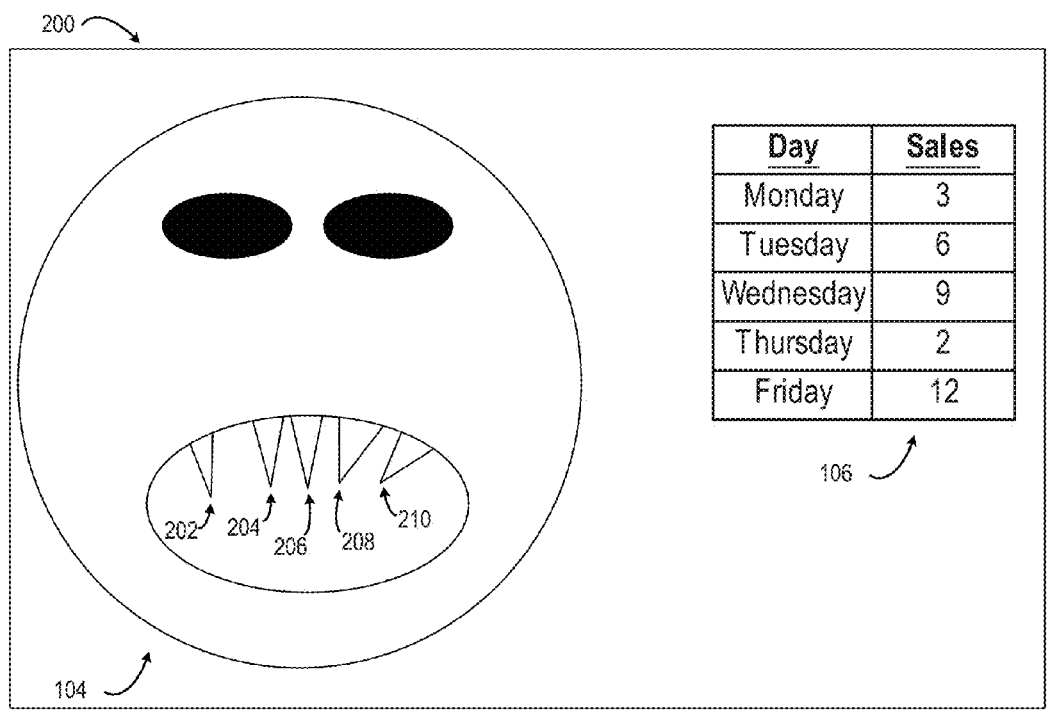
FIG. 2 is a diagram depicting an example of a graphical interface used by the graphics editing application of FIG. 1 to map the delimited data set to graphical objects of the vector-based graphic according to certain exemplary embodiments.

In the example depicted in FIG. 2, the vector-based graphic 104 is a face with depictions of teeth (i.e., the graphical objects 202, 204, 206, 208, 210). The vector-based graphic 104, such as (but not limited to) an SVG graphic, includes graphical objects that are defined using vectors. In the example depicted in FIG. 1, the depiction of the face, the eyes, the mouth, and the teeth are rendered for display by the graphics editing application 102 or another suitable application using multiple vectors. One or more vectors can include, for example, vector values specifying positions of anchor points defining various paths of the graphical objects, colors of the paths, and colors of spaces enclosed by the paths (e.g., the black color used to fill the space enclosed by the eyes of the face).

The delimited data set 106 depicted in FIG. 2 includes multiple columns corresponding to fields and multiple rows corresponding to records of the data set 106. For example, each sales record depicted in FIG. 2 has a first field ("Day") identifying a day of the week and a second field ("Sales") identifying a number of sales during the day.

A mapping of the delimited data set 106 to graphical objects in the vector-based graphic 104 allows visual properties of the graphical objects to be controlled by one or more data properties in the delimited data set 106. The data property values in the "Day" field can be mapped to respective graphical objects 202, 204, 206, 208, 210. For instance, vector values defining one or more paths (e.g., anchor point subsets) for each of the graphical objects 202, 204, 206, 208, 210 can be mapped to the "Day" field values. Furthermore, the data property values in the "Sales" field can be mapped to lengths, colors, or other visual properties of the graphical objects 202, 204, 206, 208, 210. For instance, vector values defining one or more path lengths (e.g., anchor point coordinates) for each of the graphical objects 202, 204, 206, 208, 210 can be mapped to the "Sales" field values.

In one example, the graphics editing application 102 modifies the lengths of the graphical objects 202, 204, 206, 208, 210, which are selected to represent various days of the week identified in the data set 106. The modified lengths correspond to the numbers of sales on respective days. The modified length of the graphical object 202, which corresponds to a day with three sales, may be one-fourth of the modified length of the graphical object 210, which corresponds to a day with twelve sales. Thus, the visual properties of the mapped graphical objects 202, 204, 206, 208, 210 can graphically represent the relationships among data in the delimited data set 106.

Figure 3:
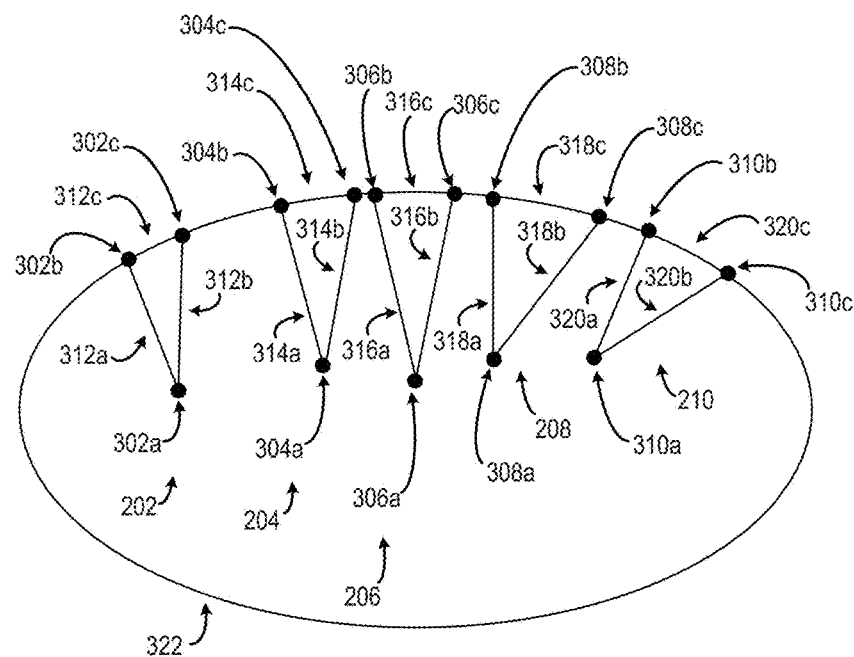
FIG. 3 is a diagram depicting an example of anchor points that define the graphical objects of FIG. 2 in the vector-based graphic according to certain exemplary embodiments.

In some embodiments, at least some of the graphical objects in the vector-based graphic 104 are defined by sets of anchor points. FIG. 3 is a diagram depicting an example of anchor points that define the graphical objects 202, 204, 206, 208, 210 in the vector-based graphic 104. In this example, the graphical object 202 is defined by anchor points 302a-c, the graphical object 204 is defined by anchor points 304a-c, the graphical object 206 is defined by anchor points 306a-c, the graphical object 208 is defined by anchor points 308a-c, and the graphical object 210 is defined by anchor points 310a-c.

Each graphical object includes multiple paths, which may be line segment or curves, between certain pairs of anchor points. In the example depicted in FIG. 3, the graphical object 202 includes a first path 312a (e.g., a line segment) between the anchor points 302a and 302b, a second path 312b (e.g., a line segment) between the anchor points 302a and 302c, and a path 312c (e.g., a curved segment) between the anchor points 302b and 302c. The graphical object 204 includes a first path 314a between the anchor points 304a and 304b, a second path 314b between the anchor points 304a and 304c, and a path 314c between the anchor points 304b and 304c. The graphical object 206 includes a first path 316a between the anchor points 306a and 306b, a second path 316b between the anchor points 306a and 306c, and a path 316c between the anchor points 306b and 306c. The graphical object 208 includes a first path 318a between the anchor points 308a and 308b, a second path 318b between the anchor points 308a and 308c, and a path 318c between the anchor points 308b and 308c. The graphical object 210 includes a first path 320a between the anchor points 310a and 310b, a second path 320b between the anchor points 310a and 310c, and a path 320c between the anchor points 310b and 310c. In addition, the "mouth" of the face depicted by the vector-based graphic includes a path 322 (e.g., a curved segment) between the anchor points 302b and 310c as well as the paths 312c, 314c, 316c, 318c, 320c.

Figure 4:
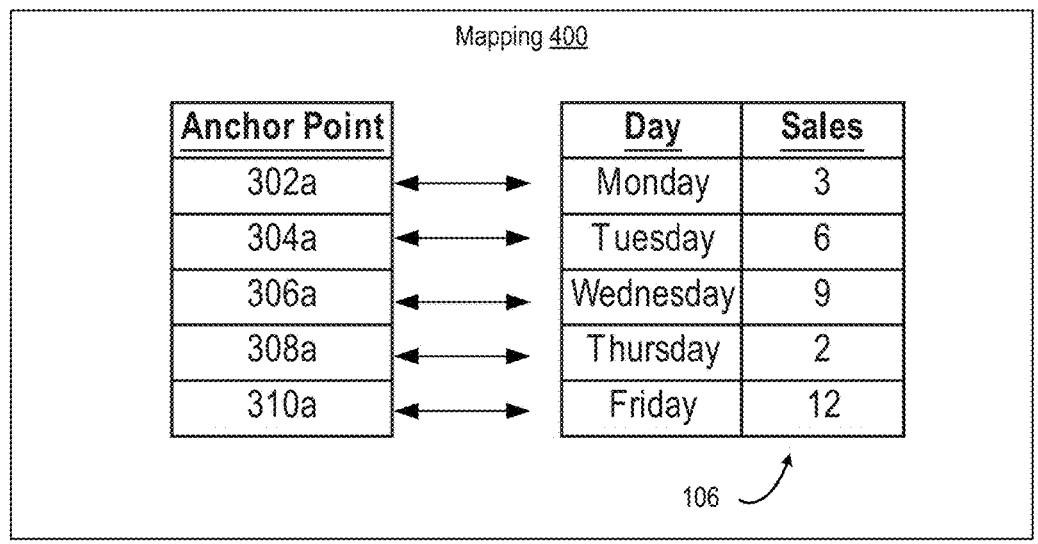
FIG. 4 is a diagram depicting an example of a mapping used by the graphics editing application of FIG. 1 to graphically depict data from the delimited data set according to certain exemplary embodiments.

In some embodiments, certain subsets of the anchor points depicted in FIG. 3 can be mapped to certain fields or other data properties in the delimited data set 106. For example, FIG. 4 is a diagram depicting an example of a mapping 400 used by the graphics editing application 102 to graphically depict data from a delimited data set 106. In this example, the anchor points 302a-c are mapped to respective data properties of the data set 106.

For instance, the mapping 400 can include data indicating that the anchor points 302a, 304a, 306a, 308a, 310a are respectively associated with the values of the "Day" field in the delimited data set 106. Thus, the value "Monday" is associated with the anchor point 302a of the graphical object 202, the value "Tuesday" is associated with the anchor point 304a of the graphical object 204, etc.

In some embodiments, the mapping 400 includes data indicating that certain visual properties that are at least partially defined by anchor points 302a, 304a, 306a, 308a, 310a are respectively associated with the values of the "Sales" field in the delimited data set 106. For example, the mapping 400 can indicate that positions of the respective anchor points 302a, 304a, 306a, 308a, 310a, which may be indicated by coordinates in an x-y plane or other suitable coordinates, are controlled by the values of the "Sales" field.

The mapping 400 can be created in any suitable manner. In some embodiments, the graphical interface 200 is configured to allow fields in the data set 106 to be mapped to anchor points or other portions of graphical objects using a drag-and-drop functionality. For example, the graphical interface 200 may display indicators of the anchor points in various graphical objects. Inputs received from a user via the graphical interface 200 may cause representations of certain anchor points to be dragged to a display of the data set 106, or vice versa. Dropping the graphical representation of an item being mapped (e.g., an anchor point or a field) to the graphical representation of another item (e.g., an anchor point or a field) causes the graphics editing application 102 to automatically generate data updating the mapping 400.

For example, the graphics editing application 102 can respond to these inputs by creating or modifying a table that associates one or more anchor points, paths, or other portions of one or more graphical objects with one or more fields of the data set 106 (e.g., the "Day" field). The graphics editing application 102 can also display a dialog, tool box, or other interface that allows a user to enter, select, or otherwise indicate mappings between one or more additional fields of the data set 106 (e.g., the "Sales" field) and one or more aspects (e.g., color, length, position, etc.) of one or more graphical object portions (e.g., anchor points, paths, etc.).

Figure 5:
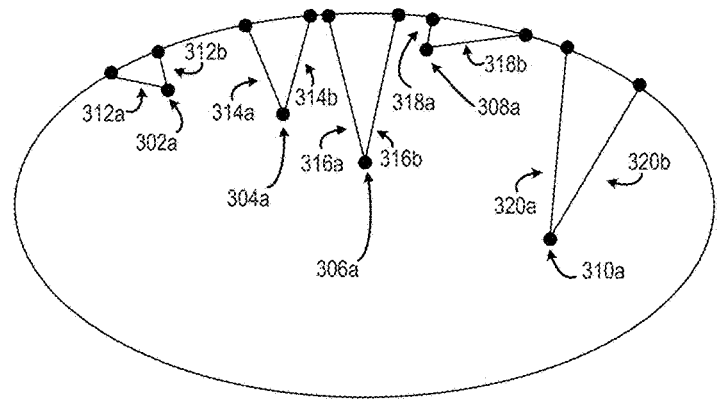
FIG. 5 is a diagram depicting an example of modifying positions of certain anchor points of FIG. 3 based on the mapping of FIG. 4 according to certain exemplary embodiments.

FIG. 5 is a diagram depicting an example of modifying positions of certain anchor points based on the mapping 400. In this example, the graphics editing application 102 modifies the positions of respective anchor points 302a, 304a, 306a, 308a, 310a based on the values of the "Sales" field. Modifying these anchor point positions changes the lengths of paths (i.e., visual properties) associated with the anchor points 302a, 304a, 306a, 308a, 310a. For example, the graphics editing application 102 can determine, based on the mapping 400, that the relative lengths of the paths corresponding to the anchor points 302a, 304a, 306a, 308a, 310a should correspond to the relative differences in the "Sales" values. Thus, paths 312a, 312b corresponding to the anchor point 302a that is mapped to the "Sales" value of "3" should have lengths that are one-fourth of the lengths of paths 320a, 320b corresponding to the anchor point 310 that is mapped to the "Sales" value of "12."

In this example, the graphics editing application 102 translates the anchor point 310a so that the path 320a is four times the length of the path 312a and the path 320b is four times the length of the path 312b. The graphics editing application 102 also translates the anchor points 304a, 306a, 308a so that the differences in length among the paths 312a, 314a, 316a, 318a are proportional to the differences in "Sales" value among the first four records of the data set 106 and the differences in length among the paths 312b, 314b, 316b, 318b are proportional to the differences in "Sales" value among the first four records of the data set 106.

Figure 6:
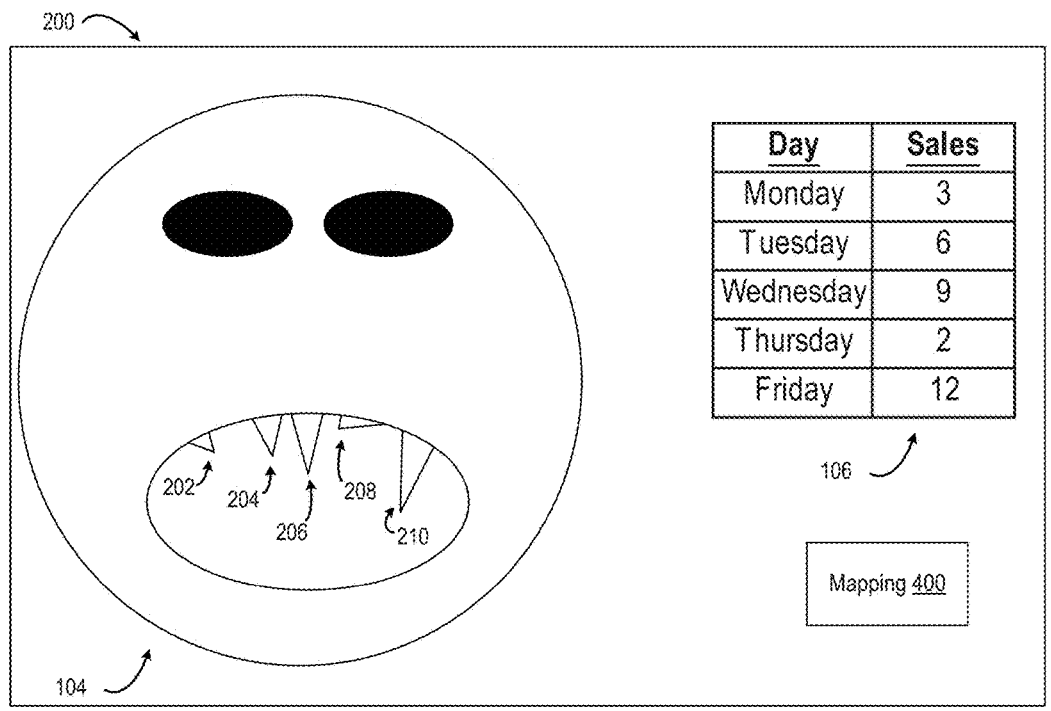
FIG. 6 is a diagram depicting an example of an updated graphical interface with graphical objects with visual properties that have been modified based on the mapping of FIG. 4 according to certain exemplary embodiments.

FIG. 6 is a diagram depicting an example of an updated graphical interface 200 with graphical objects with visual properties that have been modified based on the mapping 400. As depicted in FIG. 6, the graphical objects 202, 204, 206, 208, 210 have respective sizes that correspond to the respective data values in the "Sales" field of the data set 106. Thus, the relative sizes of the graphical objects 202, 204, 206, 208, 210 visually depict the relative numbers of sales on different days of the week included in the data set 106.

Figure 7:
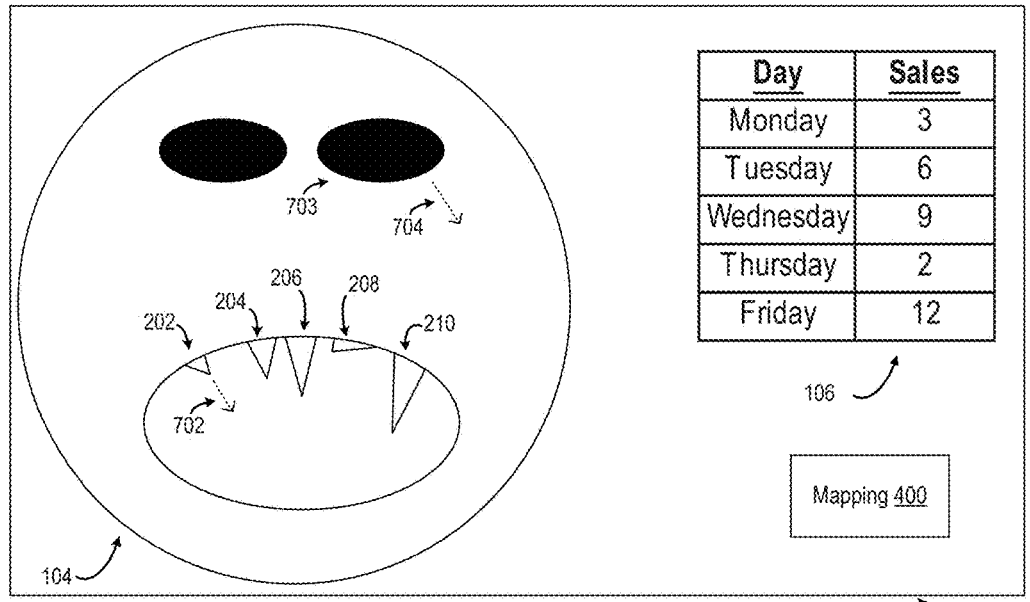
FIG. 7 is a diagram depicting an example of a graphical interface that receives inputs specifying modifications to visual properties of graphical objects in the vector-based graphic of FIGS. 1 and 6 that is mapped to a delimited data set according to certain exemplary embodiments.

In some embodiments, the graphics editing application 102 constrains manipulations of other graphical objects in accordance with the mapping 400, but allows graphical objects that are not constrained by data mappings to be freely manipulated. For example, FIG. 7 is a diagram depicting an example of a graphical interface 200 that receives inputs 702, 704 specifying modifications to visual properties of graphical objects in the vector-based graphic 104 that is mapped to the delimited data set 106. The sizes of the graphical objects 202, 204, 206, 208, 210 have been modified in accordance with the mapping 400, as described above with respect to FIGS. 3-6.

In the example depicted in FIG. 7, inputs 702, 704 are received by the graphics editing application 102 via the graphical interface 200. In some embodiments, the inputs 702, 704 are received subsequent to creating the mapping 400 and modifying visual properties of graphical objects in accordance with the mapping 400. The input 702 specifies a modification to a visual property (e.g., a size) of the graphical object 202 that is subject to the mapping 400. The input 704 specifies a modification to a visual property (e.g., a size) of a graphical object 703 that is not subject to the mapping 400. For example, the graphical object 703 may not include any anchor points that are mapped to any data properties of the delimited data set 106.

Figure 8:
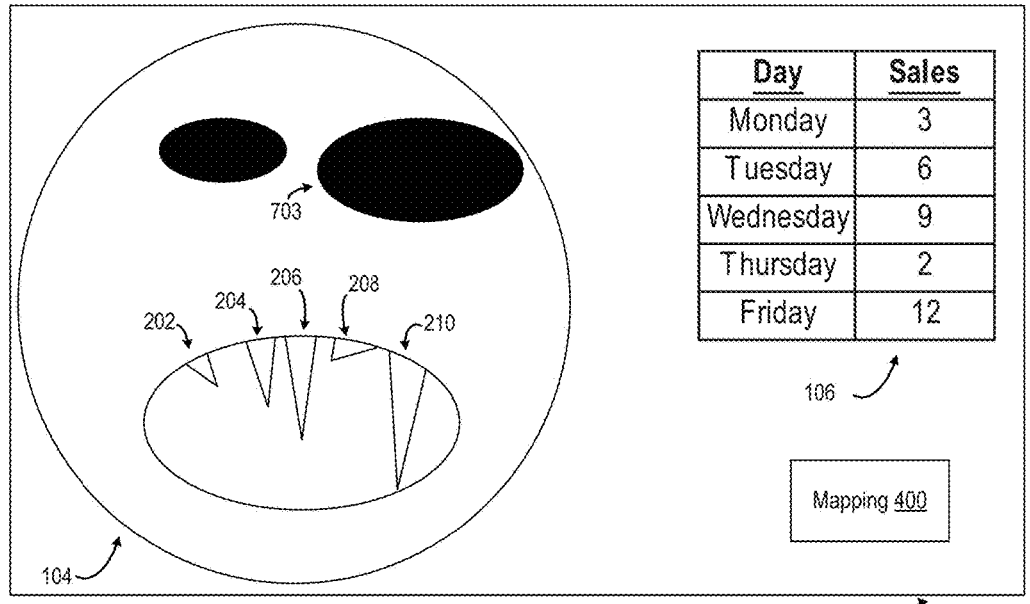
FIG. 8 is a diagram depicting an example of the graphical interface that has been updated based on the modifications specified by the inputs of FIG. 7 according to certain exemplary embodiments.

FIG. 8 is a diagram depicting an example of the graphical interface 200 that has been updated based on the modifications specified by the inputs 702, 704. In this example, the graphics editing application 102 applies a constraint to the modification specified by the input 702. The graphics editing application 102 determines the constraint based on the mapping 400. The constraint can include, for example, restricting visual property values (e.g., shape sizes) to maintain a relationship among the visual property values that corresponds to a relationship among the data property values in the data set 106. In the example depicted in FIG. 8, the graphics editing application 102 applies the same change in the size of the graphical object 202 (e.g., a size increase of 25%) to each of the graphical objects 204, 206, 208, 210.

The graphics editing application 102 applies a modification specified by the input 704 without a constraint. For example, the graphics editing application 102 may determine that the mapping 400 does not include any anchor points of the graphical object 703. Thus, the graphics editing application 102 determines that the graphical object 703 does not include any anchor points that are mapped to any data properties of the delimited data set 106. The graphics editing application 102 changes the size of the graphical object 703 in accordance with the modification specified by the input 704 without otherwise applying a mapping-based constraint to the modification.

Figure 9:
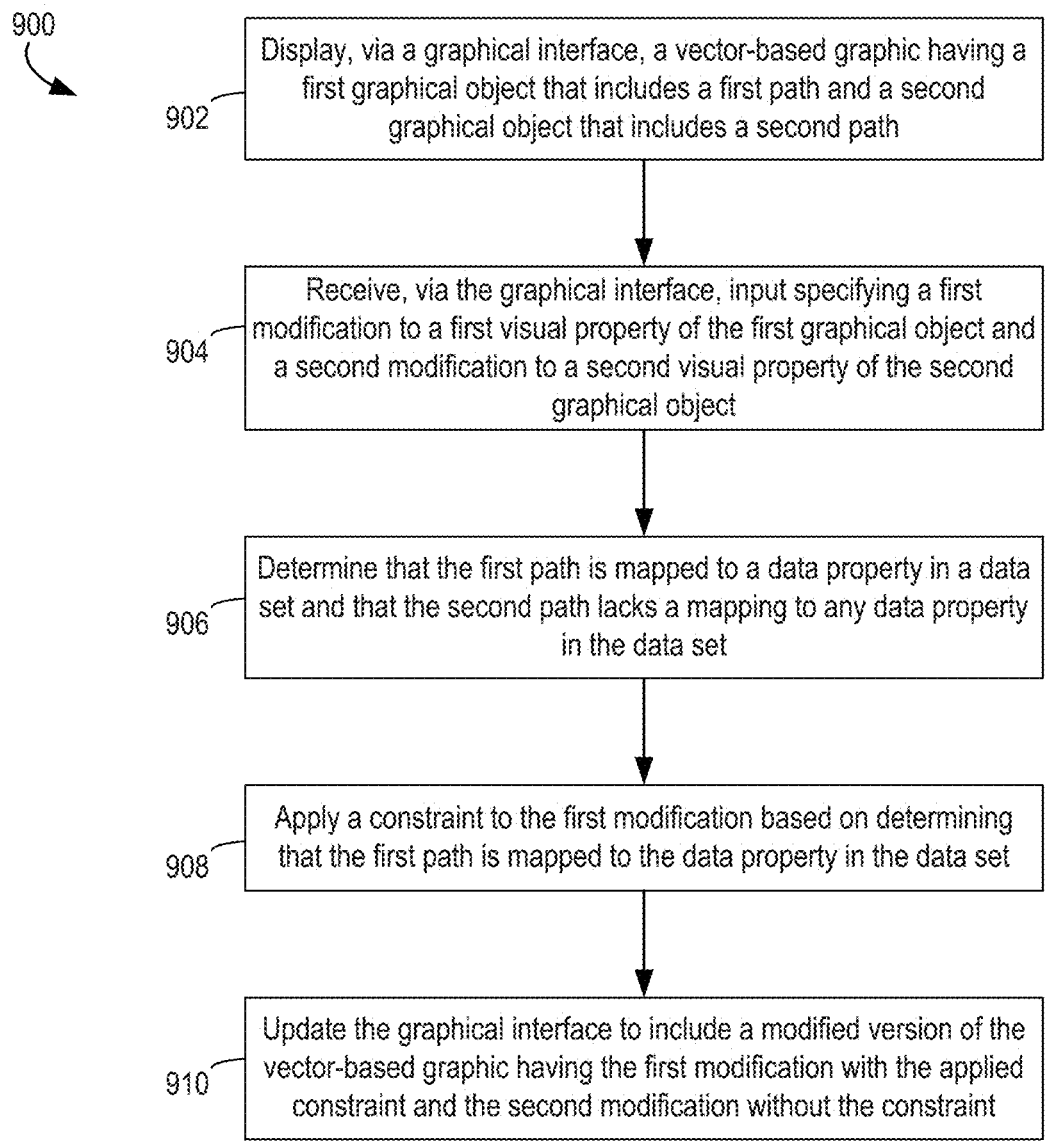
FIG. 9 is a flow chart depicting an example of a process for modifying a vector-based graphic that graphically depicts data from a delimited data set according to certain exemplary embodiments.

FIG. 9 is a flow chart depicting an example of a process 900 for modifying a vector-based graphic that graphically depicts data from a delimited data set. In some embodiments, one or more processing devices of the computing system 100 implement operations depicted in FIG. 9 by executing suitable program code (e.g., the graphics editing application 102). For illustrative purposes, the process 900 is described with reference to the examples depicted in FIGS. 1-8. Other implementations, however, are possible.

At block 902, the process 900 involves displaying, via a graphical interface, a vector-based graphic having a first graphical object that includes a first path and a second graphical object that includes a second path. For example, a processing device of the computing system 100 executes the graphics editing application 102 to render a graphical interface 200 for display. The graphical interface 200 displays the vector-based graphic 104, as depicted in the examples of FIGS. 2 and 6-8. In some embodiments, the vector-based graphic 104 is defined by anchor points and associated paths (e.g., line or curve segments), as depicted in the example of FIG. 3.

At block 904, the process 900 involves receiving, via the graphical interface, one or more inputs specifying a first modification to a first visual property of the first graphical object and a second modification to a second visual property of the second graphical object. For example, a processing device of the computing system 100 executes the graphics editing application 102 to identify inputs that have been received via the graphical interface 200 (e.g., touch inputs, mouse inputs, keyboard inputs, etc.). The graphics editing application 102 identifies modifications in visual properties corresponding to the identified inputs. For instance, in the example depicted in FIG. 7, a first input 702 specifies a change in the size (i.e. a visual property) of a graphical object 202, and a second input 704 specifies a change in the size (i.e. a visual property) of a graphical object 703.

At block 906, the process 900 involves determining that the first path is mapped to a data property in a data set and that the second path lacks a mapping to any data property in the data set. A processing device of the computing system 100 executes the graphics editing application 102 to determine that one or more paths that define a first graphical object are associated with a delimited data set 106 via a mapping 400. For example, the graphics editing application 102 can retrieve or otherwise access the mapping 400 from a non-transitory computer-readable medium. The graphics editing application 102 identifies anchor points (e.g., the anchor points 302a, 304a, 306a, 308a, 310a) or other identifiers associated with paths of graphical objects. The graphics editing application 102 matches a path of a graphical object associated with a received input (e.g., a graphical object 202 associated with an input 702) to a path associated with the mapping 400. The graphics editing application 102 also determines that a path of another graphical object associated with another received input (e.g., a graphical object 703 associated with an input 704) is not associated with the mapping 400.

At block 908, the process 900 involves applying a constraint to the first modification based on determining that the first path is mapped to the data property in the data set. For example, a processing device of the computing system 100 executes the graphics editing application 102 to apply a constraint to a modification in accordance with the mapping 400.

At block 910, the process 900 involves updating the graphical interface to include a modified version of the vector-based graphic having the first modification with the applied constraint and the second modification without the constraint. For example, a processing device of the computing system 100 executes the graphics editing application 102 to update the graphical interface 200. Updating the graphical interface 200 can include, for example, rendering the vector-based graphic 104 with changes in the sizes of the graphical objects 202, 204, 206, 208, 210 that the graphics editing application 102 determines based on the mapping 400, as depicted in the example of FIG. 8. Updating the graphical interface 200 can also include rendering the vector-based graphic 104 with a change in the sizes of the graphical object 703, as depicted in the example of FIG. 8.

In some embodiments, the graphics editing application 102 is used to map subsets of anchor points in graphical objects to properties in a delimited data set 106. The mapping between subsets of anchor points and data properties controls changes to visual properties of the graphical objects.

Figure 10:
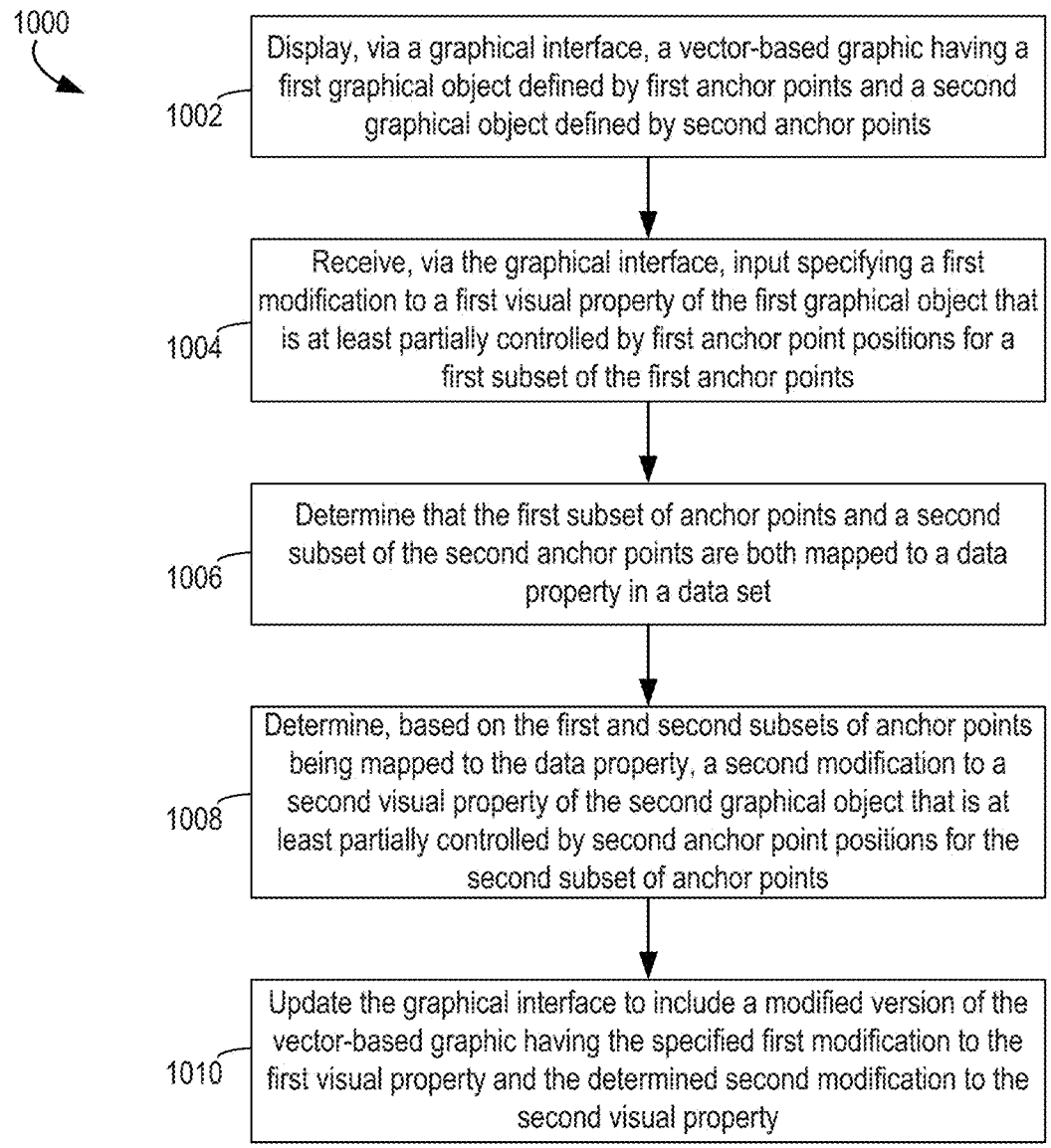
FIG. 10 is a flow chart depicting an example of a process for modifying a vector-based graphic based on data mappings to subsets of anchor points of graphical objects according to certain exemplary embodiments.

For example, FIG. 10 is a flow chart depicting an example of a process 1000 for modifying a vector-based graphic based on data mappings to subsets of anchor points of graphical objects. In some embodiments, one or more processing devices of the computing system 100 implement operations depicted in FIG. 10 by executing suitable program code (e.g., the graphics editing application 102). For illustrative purposes, the process 1000 is described with reference to certain examples described above. Other implementations, however, are possible.

At block 1002, the process 1000 involves displaying, via a graphical interface, a vector-based graphic having a first graphical object defined by first anchor points and a second graphical object defined by second anchor points. For example, a processing device of the computing system 100 executes the graphics editing application 102 to render a graphical interface 200 for display. The graphical interface 200 depicts the vector-based graphic 104, as depicted in FIGS. 2 and 6-8.

FIG. 11 is a diagram depicting an example of graphical objects having sets of anchor points that can be partially mapped to properties of a data set. In this example, the vector-based graphic 104 includes graphical objects 1100, 1106. The graphical object 1100 is defined by anchor points 1102*a-e*. The graphical object 1100, as displayed by the graphics editing application 102, includes paths 1104*a-e* that are line segments between certain pairs of the anchor points 1102*a-e*. The graphical object 1106 is defined by anchor points 1108*a-e*. The graphical object 1100, as displayed by the graphics editing application 102, includes paths 1110*a-e* that are line segments between certain pairs of the anchor points 1108*a-e*.

Returning to FIG. 10, at block 1004, the process 1000 involves receiving, via the graphical interface, input specifying a first modification to a first visual property of the first graphical object, wherein the first visual property is at least partially controlled by first anchor point positions for a first subset of the first anchor points. For example, a processing device of the computing system 100 executes the graphics editing application 102 to identify inputs that have been received via the graphical interface 200 (e.g., touch inputs, mouse inputs, keyboard inputs, etc.). The graphics editing application 102 identifies modifications in visual properties corresponding to the identified inputs. For example, a first input may specify a change in the position of the anchor point 1102*a*, and a second input may specify a change in the position of the anchor point 1108*a*.

At block 1006, the process 1000 involves determining that the first subset of anchor points and a second subset of the second anchor points are both mapped to a data property in a data set. A processing device of the computing system 100 executes the graphics editing application 102 to determine that one or more anchor points that define a first graphical object are associated with a delimited data set 106 via a mapping.

FIG. 12 is a diagram depicting an example of a mapping 1200 between subsets of anchor points and properties of a delimited data set. In this example, a first subset of anchor points 1102*a-c* from the set of anchor points 1102*a-e* is mapped to a first record of the data set 106, and a second subset of anchor points 1108*a-c* from the set of anchor points 1108*a-e* is mapped to a second record of the data set 106.

In some embodiments, the graphics editing application 102 that executes the block 1006 retrieves or otherwise accesses the mapping 1200 from a non-transitory computer-readable medium. The graphics editing application 102 identifies the anchor points 1102*a-c*, 1108*a-c* included in the mapping. The graphics editing application 102 matches the input received at block 1004 with the identified anchor points 1102*a-c*.

Returning to FIG. 10, at block 1008, the process 1000 involves determining, based on the first subset of anchor points and the second subset of anchor points being mapped to the data property, a second modification to a second visual property of the second graphical object that is at least partially controlled by second anchor point positions for the second subset of anchor points. For example, a processing device of the computing system 100 executes the graphics editing application 102 to determine a relationship between different field values in different records of the data set 106, such as the relationship among the different values in the "Sales" field of the data set 106. The graphics editing application 102 determines, based on the mapping 1200, that a similar or otherwise corresponding relationship among different values of visual properties in the vector-based graphic 104 should be maintained.

For example, in the mapping 1200 depicted in FIG. 12, the first "Sales" value has a 2:3 relationship with the second "Sales" value. The graphics editing application 102 determines that values for visual properties associated with the subsets of anchor points 1102*a-c*, 1108*a-c* should likewise have a 2:3 relationship. An example of a visual property is a size of a graphical object portion that is defined by a subset of anchor points. In the example depicted in FIG. 11, a first height of the portion of the graphical object 1100 that is defined by the anchor points 1102*a-c* (i.e. the paths 1104*a*, 1104*b*) can be constrained so that the first height has a 2:3 relationship with a second height of the portion of the graphical object 1106 that is defined by the anchor points 1108*a-c* (i.e. the paths 1110*a*, 1110*b*).

At block 1010, the process 1000 involves updating the graphical interface to include a modified version of the vector-based graphic having the specified first modification to the first visual property and the determined second modification to the second visual property. For example, a processing device of the computing system 100 executes the graphics editing application 102 to update the graphical interface 200. Updating the graphical interface 200 can include, for example, rendering the vector-based graphic 104 with changes in the graphical objects 1100, 1106 that the graphics editing application 102 determines based on the mapping 1200.

FIG. 13 is a diagram depicting an example of graphical objects 1100, 1106 with the modifications based on subsets of anchor points being mapped to properties of the data set 106. In this example, the graphics editing application 102 increases the size of the graphical object portion defined by anchor points 1102a-c and the size of the graphical object portion defined by anchor points 1108a-c. The increased sizes of the graphical object portions are constrained so that the graphical object portions have a 2:3 relationship in sizes.

In the example depicted in FIGS. 11-13, the graphical object portions that are not subject to the mapping 1200 are not modified in accordance with a mapping-based constraint. For example, the mapping 1200 does not include the anchor points 1102d, 1102e, 1108d, 1108e. Therefore, the graphics editing application 102 does not modify the size of the graphical object portion defined by anchor points 1102d, 1102e or the graphical object portion defined by anchor points 1108d, 1108e based on relationships between data values in the data set 106.

Although the examples above describe mapping path lengths to data properties in a data set, the graphics editing application 102 can map data properties to any suitable visual properties defined by vectors of a vector-based graphic 104. In some embodiments, colors associated with paths or spaces enclosed by paths are mapped to data properties. For example, if a first record in the data set is mapped to a first path and a second record in the data set is mapped to a second path, a relationship between field values (e.g., a first field value being twice the second field value) can be graphically depicted by changing first color information associated with a first path and second color information for a second path to reflect the relationship between field values. In additional or alternative embodiments, other visual properties associated with graphical objects (e.g., positions of anchor points, curvature of segments connecting pairs of anchor points, etc.) can also be used to graphically depict relationships among data in a delimited data set.

Figure 14:
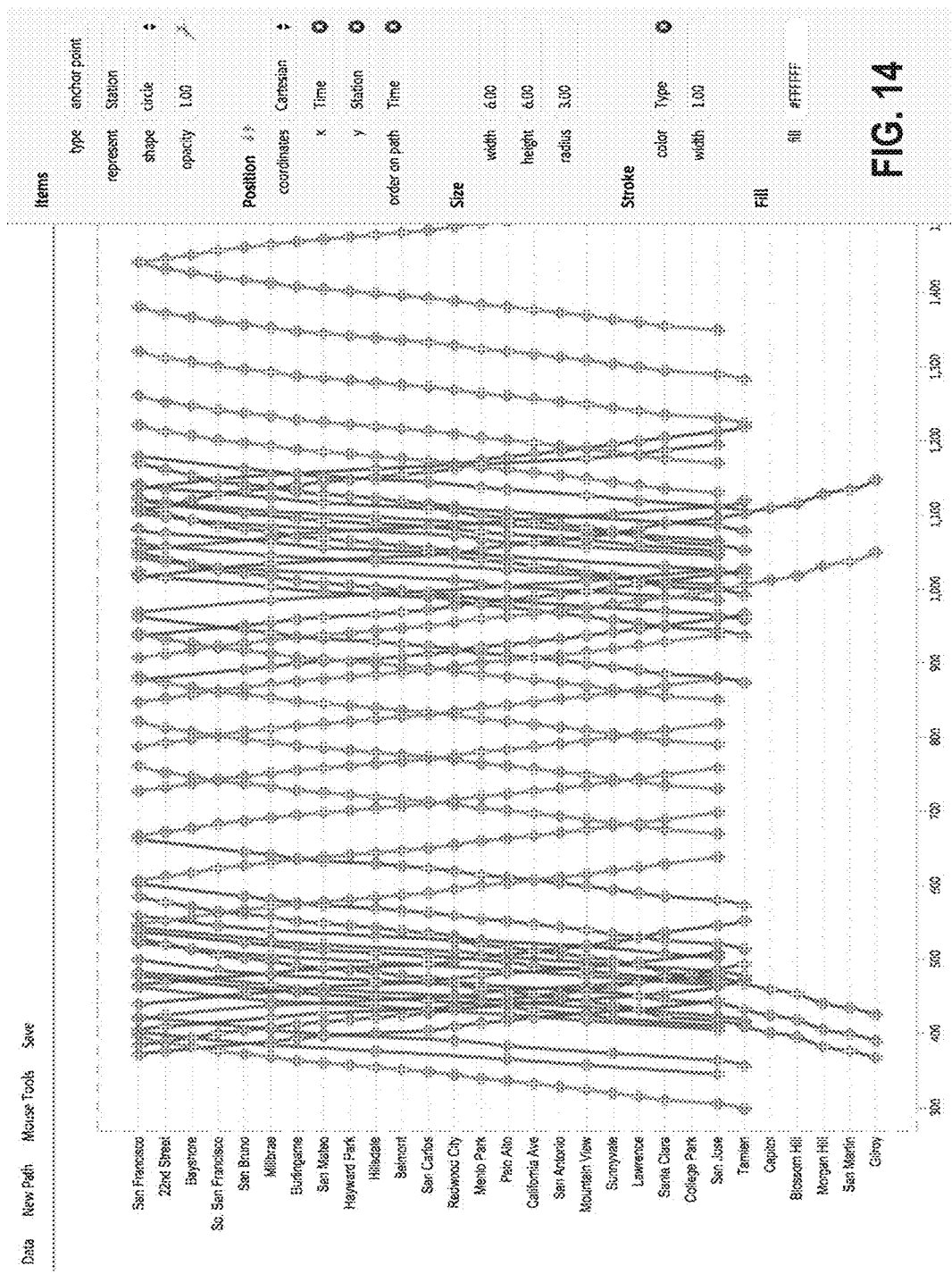
FIG. 14 is a diagram depicting another example of graphical objects having sets of anchor points mapped to properties of a data set according to certain exemplary embodiments.

FIG. 14 depicts another example in sets of anchor points are mapped to properties of a data set. In this example, the data set 106 includes a train schedule having a first column for train stations and a second column for scheduled times associated with the trains (e.g., arrivals or departures). The vector-based graphic 104 includes a set of curves in a Cartesian plane that are defined by anchor points. The graphics editing application 102 is used to map anchor points to stations and to map anchor point positions to times associated with the trains. Thus, the graphics editing application 102 provides an intuitive manner of graphically depicting schedules associated with the various stations.

Figure 15:
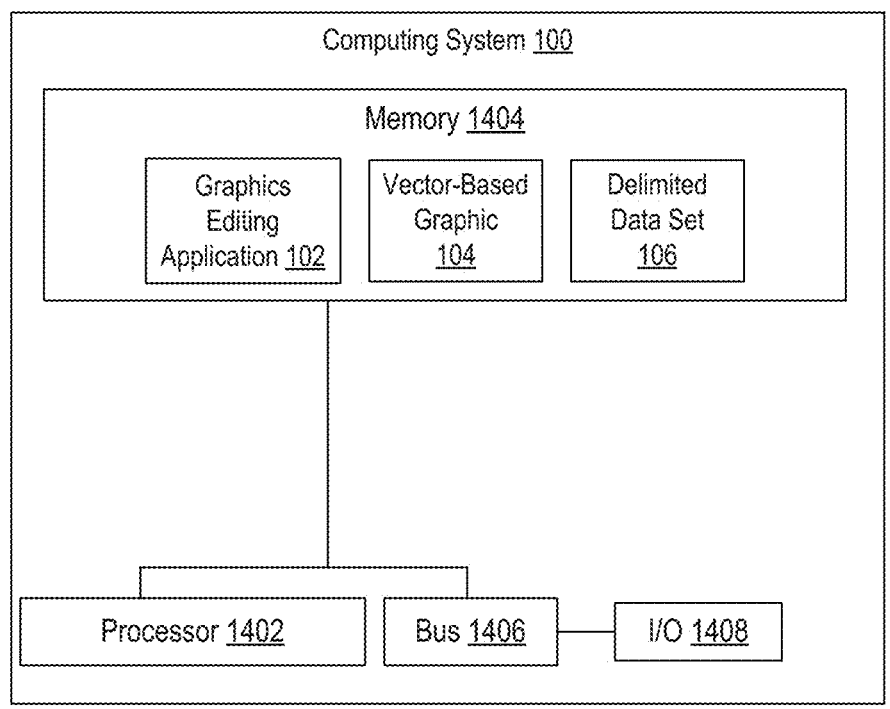
FIG. 15 is a block diagram depicting an example of an implementation for a computing system that executes the graphics editing application of FIG. 1 according to certain exemplary embodiments.

Any suitable computing system or group of computing systems can be used for performing the operations described herein. For example, FIG. 15 is a block diagram depicting an example of a computing system 100 that executes a graphics editing application 102 for using a vector-based graphic 104 to graphically depict data from a delimited data set 106.

The depicted example of the computing system 100 includes one or more processors 1402 communicatively coupled to one or more memory devices 1404. The processor 1402 executes computer-executable program code stored in the memory device 1404, accesses information stored in the memory device 1404, or both. Examples of a processor 1402 include a microprocessor, an application-specific integrated circuit ("ASIC"), a field-programmable gate array ("FPGA"), or other suitable processing device. The processor 1402 can include any number of processing devices, including one.

The memory device 1404 includes any suitable non-transitory computer-readable medium for storing the graphics editing application 102, the vector-based graphic 104, and the delimited data set 106. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler, an interpreter, or both from program code written in any suitable computer-programming language, including, for example, C, C++, C#, Visual Basic, Java, Python, Perl, JavaScript, and ActionScript.

The computing system 100 may also include a number of external or internal devices such as input or output devices. For example, the computing system 100 is shown with an input/output ("I/O") interface 1408 that can receive input from input devices or provide output to output devices. A bus 1406 can also be included in the computing system 100. The bus 1406 can communicatively couple one or more components of the computing system 100.

The computing system 100 executes program code that configures the processor 1402 to perform one or more of the operations described above with respect to FIGS. 1-14. The program code includes, for example, one or more of the graphics editing application 102 or other suitable applications that perform one or more operations described herein. The program code may be resident in the memory device 1404 or any suitable computer-readable medium and may be executed by the processor 1402 or any other suitable processor. In some embodiments, the program code described above, the vector-based graphic 104, and the delimited data set 106 are stored in the memory device 1404, as depicted in FIG. 15. In additional or alternative embodiments, one or more of the program code described above, the vector-based graphic 104, and the delimited data set 106 are stored in one or more memory devices accessible via a data network, such as a memory device accessible via a cloud service.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for modifying vector-based graphics using path-based mapping between graphical objects and data sets, the method comprising:
    displaying, via a graphical interface generated by a processor, a vector-based graphic having (i) a first graphical object defined by a first plurality of connected paths that includes a first path, (ii) a second graphical object defined by a second plurality of connected paths that includes a second path, and (iii) a third graphical object that includes a third path;
    receiving, via the graphical interface, input specifying a first modification to a first visual property of the first graphical object and a second modification to a second visual property of the second graphical object;
    determining, by the processor, that the first path is mapped to a data property in a data set, that the second path lacks a mapping to any data property in the data set, and that the third path is also mapped to the data property;
    applying a constraint to the first modification based on determining that the first path is mapped to the data property in the data set, wherein applying the constraint to the first modification comprises:
        determining a data relationship between data property values of the data property that are respectively mapped to the first path and the third path, and
        restricting visual property values of the first visual property and a third visual property of the third path, respectively, to maintain a visual relationship between the visual property values such that the visual relationship corresponds to the data relationship between the data property values; and
    updating the graphical interface to include a modified version of the vector-based graphic having the first modification with the applied constraint and the second modification without the constraint.

2. The method of claim 1, wherein the first path comprises a first line or curve segment between a first pair of anchor points and the second path comprises a second line or curve segment between a second pair of anchor points,
    wherein determining that the first path is mapped to the data property comprises determining that a value of a first field of a record in the data set is mapped to at least one anchor point of the first pair of anchor points,
    wherein applying the constraint to the first modification comprises restricting a visual property value of the first visual property to correspond to a value of a second field of the record in the data set.

3. The method of claim 1, wherein restricting the visual property values to maintain the visual relationship between the visual property values such that the visual relationship corresponds to the data relationship between the data property values comprises at least one of:
    maintaining a relationship between lengths of the first path and the third path that corresponds to the data relationship between the data property values;
    maintaining a relationship between anchor point positions of the first path and the third path that corresponds to the data relationship between the data property values;
    maintaining a relationship between curvatures of the first path and the third path that corresponds to the data relationship between the data property values; or
    maintaining a relationship between colors of the first path and the third path that corresponds to the data relationship between the data property values.

4. The method of claim 1, further comprising:
    receiving, via the graphical interface and subsequent to updating the graphical interface, additional input specifying an additional modification to one of the first visual property of the first graphical object or the third visual property of the third graphical object;
    applying the constraint to the additional modification based on determining that the first path and the third path are mapped to the data property in the data set; and
    updating the graphical interface to include an additional modified version of the vector-based graphic having updated visual property values of the first visual property and the third visual property, respectively, wherein a relationship between the updated visual property values corresponds to the data relationship between the data property values.

5. The method of claim 1, wherein the first graphical object is defined by first anchor points of the connected paths and the vector-based graphic comprises a fourth graphical object defined by second anchor points, wherein the first visual property is at least partially controlled by first anchor point positions for a first anchor-point subset from the first anchor points, and wherein the method further comprises:
    determining, by the processor, that the data property in the data set is mapped to both (i) the first anchor-point subset and (ii) a second anchor-point subset from the second anchor points, wherein an additional subset of the first anchor points lacks any mapping to the data property and an additional subset of the second anchor points lacks any mapping to the data property; and identifying, by the processor and based on the first anchor-point subset and the second anchor-point subset being mapped to the data property, a third modification to a fourth visual property of the fourth graphical object, wherein the fourth visual property is at least partially controlled by second anchor point positions for the second anchor-point subset, wherein updating the graphical interface to include the modified version of the vector-based graphic comprises updating the graphical interface to include a modified version of the fourth graphical object having the identified third modification to the fourth visual property.

6. The method of claim 5, wherein updating the graphical interface to include the modified version of the vector-based graphic comprises:

applying the first modification by modifying a portion of the first graphical object that corresponds to the first anchor-point subset, wherein the additional subset of the first anchor points is excluded, based on the additional subset of the first anchor points lacking any mapping to the data property, from the application of the first modification;

applying the third modification by modifying a portion of the fourth graphical object that corresponds to the second anchor-point subset, wherein the additional subset of the second anchor points is excluded, based on the additional subset of the second anchor points lacking any mapping to the data property, from the application of the third modification; and displaying, via the graphical interface, the modified portion of the first graphical object and the modified portion of the fourth graphical object.

7. The method of claim 6, wherein updating the graphical interface to include the modified version of the vector-based graphic having the specified first modification to the first visual property and the identified third modification to the fourth visual property comprises:

determining a relationship between values of the data property in a first record of the data set and a second record of the data set, respectively; and maintaining at least one of:
a relationship between lengths of the first path as defined by the first anchor-point subset and a second path as defined by the second anchor-point subset such that the relationship between the lengths corresponds to the relationship between the values of the data property in the first record and the second record, a relationship between curvatures of the first path and the second path such that the relationship between the curvatures corresponds to the relationship between the values of the data property in the first record and the second record, or a relationship between colors of the first path and the second path such that the relationship between the colors corresponds to the relationship between the values of the data property in the first record and the second record.

8. The method of claim 1, wherein the data relationship between the data property values is a first proportion between a first one of the data property values and a second one of the data property values, wherein maintaining the visual relationship that corresponds to the data relationship comprises maintaining a second proportion between the visual property values that matches the first proportion between the first one of the data property values and the second one of the data property values.

9. A system comprising:
a processing device; and
a non-transitory computer-readable medium communicatively coupled to the processing device,
wherein the processing device is configured for performing operations comprising:
displaying, via a graphical interface, a vector-based graphic having (i) a first graphical object defined by a first plurality of connected paths that includes a first path, (ii) a second graphical object defined by a second plurality of connected paths that includes a second path, and (iii) a third graphical object that includes a third path, receiving, via the graphical interface, input specifying a first modification to a first visual property of the first graphical object and a second modification to a second visual property of the second graphical object, determining that the first path is mapped to a data property in a data set, that the second path lacks a mapping to any data property in the data set, and that the third path is also mapped to the data property, applying a constraint to the first modification based on determining that the first path is mapped to the data property in the data set, wherein applying the constraint to the first modification comprises:
determining a data relationship between data property values of the data property that are respectively mapped to the first path and the third path, and restricting visual property values of the first visual property and a third visual property of the third path, respectively, to maintain a visual relationship between the visual property values such that the visual relationship corresponds to the data relationship between the data property values, and updating the graphical interface to include a modified version of the vector-based graphic having the first modification with the applied constraint and the second modification without the constraint.

10. The system of claim 9, wherein the first path comprises a first line or curve segment between a first pair of anchor points and the second path comprises a second line or curve segment between a second pair of anchor points, wherein determining that the first path is mapped to the data property comprises determining that a value of a first field of a record in the data set is mapped to at least one anchor point of the first pair of anchor points, wherein applying the constraint to the first modification comprises restricting a visual property value of the first visual property to correspond to a value of a second field of the record in the data set.

11. The system of claim 9, wherein restricting the visual property values to maintain the visual relationship between the visual property values such that the visual relationship corresponds to the data relationship between the data property values comprises at least one of:

maintaining a relationship between lengths of the first path and the third path that corresponds to the data relationship between the data property values;

maintaining a relationship between anchor point positions of the first path and the third path that corresponds to the data relationship between the data property values;

maintaining a relationship between curvatures of the first path and the third path that corresponds to the data relationship between the data property values; or maintaining a relationship between colors of the first path and the third path that corresponds to the data relationship between the data property values.

12. The system of claim 9, wherein the operations further comprise:

receiving, via the graphical interface and subsequent to updating the graphical interface, additional input specifying an additional modification to one of the first visual property of the first graphical object or the third visual property of the third graphical object;

applying the constraint to the additional modification based on determining that the first path and the third path are mapped to the data property in the data set; and updating the graphical interface to include an additional modified version of the vector-based graphic having updated visual property values of the first visual property and the third visual property, respectively, wherein a relationship between the updated visual property values corresponds to the data relationship between the data property values.

13. The system of claim 9, wherein the first graphical object is defined by first anchor points of the connected paths and the vector-based graphic comprises a fourth graphical object defined by second anchor points, wherein the first visual property is at least partially controlled by first anchor point positions for a first anchor-point subset from the first anchor points, and wherein the operations further comprise:

determining that the data property in the data set is mapped to both (i) the first anchor-point subset and (ii) a second anchor-point subset from the second anchor points, wherein an additional subset of the first anchor points lacks any mapping to the data property and an additional subset of the second anchor points lacks any mapping to the data property; and identifying, based on the first anchor-point subset and the second anchor-point subset being mapped to the data property, a third modification to a fourth visual property of the fourth graphical object, wherein the fourth visual property is at least partially controlled by second anchor point positions for the second anchor-point subset, wherein updating the graphical interface to include the modified version of the vector-based graphic comprises updating the graphical interface to include a modified version of the fourth graphical object having the identified third modification to the fourth visual property.

14. The system of claim 13, wherein updating the graphical interface to include the modified version of the vector-based graphic comprises:

applying the first modification by modifying a portion of the first graphical object that corresponds to the first anchor-point subset, wherein the additional subset of the first anchor points is excluded, based on the additional subset of the first anchor points lacking any mapping to the data property, from the application of the first modification;

applying the third modification by modifying a portion of the fourth graphical object that corresponds to the second anchor-point subset, wherein the additional subset of the second anchor points is excluded, based on the additional subset of the second anchor points lacking any mapping to the data property, from the application of the third modification; and displaying, via the graphical interface, the modified portion of the first graphical object and the modified portion of the fourth graphical object.

15. A non-transitory computer-readable medium storing program code executable by a processor for modifying vector-based graphics using path-based mapping between graphical objects and data sets, the program code comprising:

program code for displaying, via a graphical interface, a vector-based graphic having (i) a first graphical object defined by a first plurality of connected paths that includes a first path, (ii) a second graphical object defined by a second plurality of connected paths that includes a second path, and (iii) a third graphical object that includes a third path;

program code for receiving, via the graphical interface, input specifying a first modification to a first visual property of the first graphical object and a second modification to a second visual property of the second graphical object;

program code for determining that the first path is mapped to a data property in a data set, that the second path lacks a mapping to any data property in the data set, and that the third path is also mapped to the data property;

program code for applying a constraint to the first modification based on determining that the first path is mapped to the data property in the data set, wherein applying the constraint to the first modification comprises:

determining a data relationship between data property values of the data property that are respectively mapped to the first path and the third path, and restricting visual property values of the first visual property and a third visual property of the third path, respectively, to maintain a visual relationship between the visual property values such that the visual relationship corresponds to the data relationship between the data property values; and program code for updating the graphical interface to include a modified version of the vector-based graphic having the first modification with the applied constraint and the second modification without the constraint.

16. The non-transitory computer-readable medium of claim 15, wherein the first path comprises a first line or curve segment between a first pair of anchor points and the second path comprises a second line or curve segment between a second pair of anchor points, wherein determining that the first path is mapped to the data property comprises determining that a value of a first field of a record in the data set is mapped to at least one anchor point of the first pair of anchor points, wherein applying the constraint to the first modification comprises restricting a visual property value of the first visual property to correspond to a value of a second field of the record in the data set.

17. The non-transitory computer-readable medium of claim 15, wherein restricting the visual property values to maintain the visual relationship between the visual property values such that the visual relationship corresponds to the data relationship between the data property values comprises at least one of:

maintaining a relationship between lengths of the first path and the third path that corresponds to the data relationship between the data property values;

maintaining a relationship between anchor point positions of the first path and the third path that corresponds to the data relationship between the data property values;

maintaining a relationship between curvatures of the first path and the third path that corresponds to the data relationship between the data property values; or maintaining a relationship between colors of the first path and the third path that corresponds to the data relationship between the data property values.

18. The non-transitory computer-readable medium of claim 17, wherein the program code further comprises:

program code for receiving, via the graphical interface and subsequent to updating the graphical interface, additional input specifying an additional modification to one of the first visual property of the first graphical object or the third visual property of the third graphical object;

program code for applying the constraint to the additional modification based on determining that the first path and the third path are mapped to the data property in the data set; and program code for updating the graphical interface to include an additional modified version of the vector-based graphic having updated visual property values of the first visual property and the third visual property, respectively, wherein a relationship between the updated visual property values corresponds to the data relationship between the data property values.

* * * * *